(12) United States Patent
Chen

(10) Patent No.: US 9,871,574 B2
(45) Date of Patent: Jan. 16, 2018

(54) ANTENNA SIGNAL TRANSMISSION APPARATUS AND ANTENNA SIGNAL TRANSMISSION METHOD

(71) Applicant: Getac Technology Corporation, Hsinchu County (TW)

(72) Inventor: Hung-Tu Chen, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 0 days.

(21) Appl. No.: 15/090,919

(22) Filed: Apr. 5, 2016

(65) Prior Publication Data

US 2017/0288761 A1 Oct. 5, 2017

(51) Int. Cl.
*H04B 7/06* (2006.01)

(52) U.S. Cl.
CPC ................... *H04B 7/0682* (2013.01)

(58) Field of Classification Search
USPC ................... 375/267; 455/447, 41.2
See application file for complete search history.

(56) References Cited

U.S. PATENT DOCUMENTS

| | | | | |
|---|---|---|---|---|
| 7,058,139 B2* | 6/2006 | Duperray | ............... | H03C 3/403 375/297 |
| 2007/0054617 A1* | 3/2007 | Nikolajevic | ......... | H04B 7/0619 455/41.2 |
| 2009/0247171 A1* | 10/2009 | Suga | ................... | H04W 72/046 455/447 |
| 2013/0002487 A1* | 1/2013 | Hosoya | ................ | H04B 7/0617 342/372 |
| 2014/0104443 A1* | 4/2014 | Takahashi | .......... | H04N 1/00347 348/207.1 |
| 2014/0285373 A1* | 9/2014 | Kuwahara | ............. | G01S 13/931 342/27 |
| 2017/0029107 A1* | 2/2017 | Emami | ................. | B64C 39/024 |

* cited by examiner

*Primary Examiner* — Eva Puente
(74) *Attorney, Agent, or Firm* — Locke Lord LLP; Tim Tingkang Xia, Esq.

(57) ABSTRACT

An antenna is provided and characterized by searching a look-up table for emission angle information according to an incident angle of a radio frequency input signal and driving an antenna array to emit a radio frequency output signal in a direction corresponding to an incident direction of the radio frequency input signal according to the emission angle information.

7 Claims, 4 Drawing Sheets

ANTENNA SIGNAL TRANSMISSION APPARATUS AND ANTENNA SIGNAL TRANSMISSION METHOD

BACKGROUND OF THE INVENTION

Field of the Invention

The present invention relates to antennas and, more particularly, to an antenna signal transmission apparatus and an antenna signal transmission method.

Description of the Prior Art

Antennas are indispensable to plenty of wireless communication systems; and, due to communication-related technological advancements, antennas nowadays are ubiquitous in daily life. In general, depending on directivity, antennas come in three categories, namely isotropic antennas, omni-directional antennas, and directive antennas. The directive antennas send and receive electromagnetic waves in a specific direction and therefore are widely applicable to and disposed in wireless communication systems which operate mainly in a fixed direction.

However, in general, to allow two wireless communication apparatuses to communicate with each other through an antenna, it is necessary to convert a received radio frequency signal into a fundamental frequency signal, be informed of the direction and position of the other party during the stage of processing the fundamental frequency signal, and send back the signal accordingly, thereby finalizing the connection process. Doing so, however, is predisposed to directive errors and unstable connection, because the position and incoming direction of the radio frequency signal are detected only after processing the fundamental frequency signal, thereby precluding instant detection of its position and incoming direction and quick adjustment of the emission angle of the signal.

SUMMARY OF THE INVENTION

The present invention provides an antenna signal transmission apparatus and an antenna signal transmission method to emit a radio frequency output signal quickly in a direction corresponding to the incident direction of a radio frequency input signal and thereby quickly effectuate the connection of the antenna signal transmission apparatus.

The antenna signal transmission apparatus of the present invention comprises a plurality of antennas and a signal transmission control module. The plurality of antennas forms an antenna array for receiving a radio frequency input signal. The signal transmission control module searches for an emission angle information corresponding to an incident angle of the radio frequency input signal and drives the antenna array to emit a radio frequency output signal in a direction corresponding to the incident direction of the radio frequency input signal according to the emission angle information.

In an embodiment of the present invention, the signal transmission control module comprises a plurality of phase adjustment unit each comprising a look-up table unit and searches the look-up table units for an emission angle information of the antennas corresponding to the incident angle according to the incident angle of the radio frequency input signal such that the phase adjustment units send a feed signal according to the emission angle information to trigger the antennas to generate radiating beams, thereby causing the antenna array to emit the radio frequency output signal.

In an embodiment of the present invention, the emission angle information comprises information about a phase difference between the radiating beams generated from the antennas, wherein the phase difference information depends on a phase difference between the radio frequency input signals received by the antennas.

In an embodiment of the present invention, the phase adjustment units each further comprise a feed signal generating unit coupled to a corresponding one of the look-up table units and adapted to convert a power-source signal into a feed signal attributed to the antennas and corresponding to the power-source signal according to the emission angle information provided by the look-up table unit.

In an embodiment of the present invention, the feed signal generating unit comprises a 90 degree rat-race coupler, first variable gain amplifier, second variable gain amplifier, first 180 degree rat-race coupler, second 180 degree rat-race coupler, first switching unit, second switching unit and third variable gain amplifier. The 90 degree rat-race coupler generates a first real-part signal and a first imaginary-part signal according to a power-source signal. The first variable gain amplifier is coupled to the 90 degree rat-race coupler and the look-up table unit and adapted to perform gain amplification on the first real-part signal when controlled by the look-up table units, so as to generate a real-part amplification signal. The second variable gain amplifier is coupled to the 90 degree rat-race coupler and the look-up table unit and adapted to perform gain amplification on the first imaginary-part signal when controlled by the look-up table units, so as to generate an imaginary-part amplification signal. The first 180 degree rat-race coupler is coupled to the first variable gain amplifier and adapted to generate a second real-part signal and a third real-part signal according to the real-part amplification signal, wherein the second real-part signal and the third real-part signal are out of phase by 180 degrees. The second 180 degree rat-race coupler is coupled to the second variable gain amplifier and adapted to generate a second imaginary-part signal and a third imaginary-part signal according to the imaginary-part amplification signal, wherein the second imaginary-part signal and the third imaginary-part signal are out of phase by 180 degrees. The first switching unit is coupled to the first 180 degree rat-race coupler and the look-up table unit to send a second real-part signal or a third real-part signal under the control of the look-up table unit switching. The second switching unit is coupled to the second 180 degree rat-race coupler and the look-up table unit and adapted to switch and send the second imaginary-part signal or the third imaginary-part signal when controlled by the look-up table units. The synthesis unit is coupled to the first switching unit and the second switching unit and adapted to synthesize output signals of the first switching unit and the second switching unit, so as to generate a synthesis signal. The third variable gain amplifier is coupled to the synthesis unit and the look-up table unit and adapted to amplify the synthesis signal when controlled by the look-up table unit, so as to generate a feed signal for triggering the antennas to generate the radiating beams.

In an embodiment of the present invention, the signal transmission control module further comprises a plurality of switching units, a plurality of phase detection units and an addition unit. The switching units are coupled to the antennas corresponding thereto and the phase adjustment units corresponding thereto, respectively. The phase detection units are coupled to two switching units corresponding thereto and two antennas corresponding thereto, respectively, wherein the phase detection units control switching states of the switching units according to signal sending and receiving states of the antennas and according to the radio frequency input signals received by the antennas, so as to generate a plurality of phase data. The addition unit is coupled to the plurality of phase detection units and look-up table units and adapted to perform an addition computation on the phase data and thereby generate and send an incident angle information to the look-up table units such that the look-up table units provide the emission angle information according to the incident angle information.

In an embodiment of the present invention, after sending the phase data, the phase detection units switch states of the switching units corresponding thereto such that the antennas get connected to the phase adjustment units, respectively, wherein, after a predetermined period of time has elapsed from a point in time when the phase detection units switch states of the switching units, the states of the switching units are switched again such that the antennas get connected to the phase detection units, respectively.

An antenna signal transmission method of the present invention comprises the steps of: receiving a radio frequency input signal through an antenna array formed by a plurality of antennas; searching for an emission angle information according to an incident angle of the radio frequency input signal; and driving the antenna array to emit a radio frequency output signal in a direction corresponding to an incident direction of the radio frequency input signal according to the emission angle information.

In an embodiment of the present invention, the antenna signal transmission method comprises the step of searching a look-up table corresponding to one of the antennas according to an incident angle of the radio frequency input signal for the emission angle information of each said antenna corresponding to the incident angle.

In an embodiment of the present invention, the emission angle information comprises information about a phase difference between radiating beams generated from the antennas, wherein the phase difference information depends on a phase difference between the radio frequency input signals received by the antennas.

In an embodiment of the present invention, the step of driving the antenna array to emit a radio frequency output signal in a direction corresponding to an incident direction of the radio frequency input signal according to the emission angle information comprises the sub-steps of: converting a power-source signal into a feed signal corresponding to each said antenna according to the emission angle information; and sending the feed signals to the antennas, respectively, to trigger the antennas to generate radiating beams, thereby causing the antenna array to emit the radio frequency output signal.

In conclusion, the embodiments of the present invention are characterized in that: it is practicable to search for an emission angle information according to an incident angle of radio frequency input signals and thereby obtain quickly the emission angle information corresponding to the radio frequency input signals and drive an antenna array to emit radio frequency output signals in a direction corresponding to the incident direction of the radio frequency input signals; with the whole signal processing process taking place during a stage of processing the radio frequency signals, it is feasible to identify quickly the direction and position of an communication apparatus for sending a radio frequency input signal before a stage of processing a fundamental frequency signal, and therefore it is practicable to quickly effectuate the connection between the antenna signal transmission apparatus and the communication apparatus which sends the radio frequency input signal.

To ensure that the aforesaid technical features and advantages of the present invention are obvious and easy to understand, the present invention is hereunder illustrated with embodiments, depicted with drawings and described below.

DETAILED DESCRIPTION OF THE EMBODIMENTS

Figure 1:
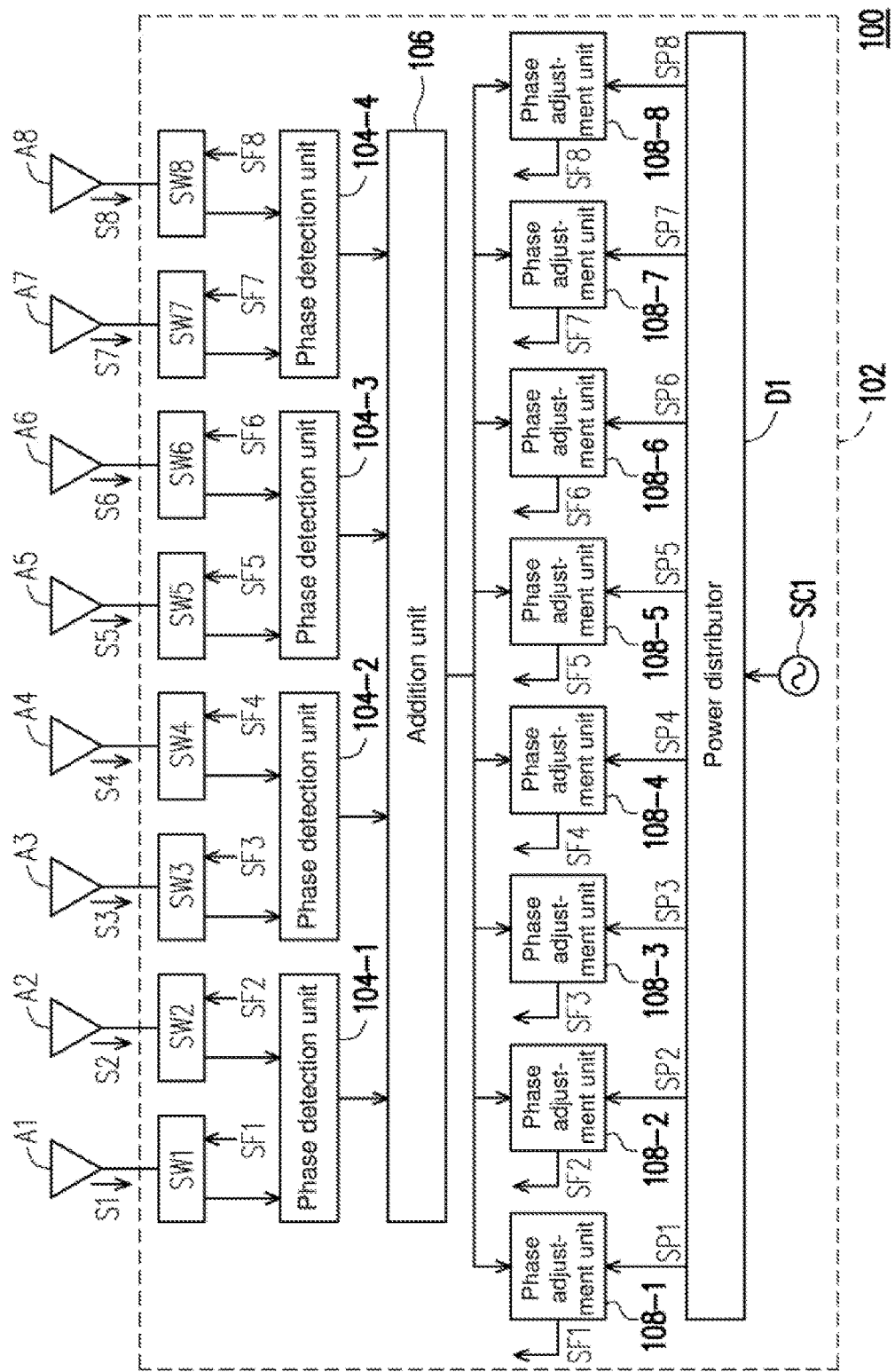
FIG. 1 is a schematic view of an antenna signal transmission apparatus according to an embodiment of the present invention.

FIG. 1 is a schematic view of an antenna signal transmission apparatus according to an embodiment of the present invention. Referring to FIG. 1, the antenna signal transmission apparatus 100 comprises a plurality of antennas A1~A8, a signal transmission control module 102, a power distributor D1 and a signal source SC1. The antennas A1~A8 form an antenna array for receiving a radio frequency signal (as shown in FIG. 1, the antennas A1~A8 receive radio frequency input signals S1~S8, respectively, and send them to switching units, respectively.) When the antennas A1~A8 receive the radio frequency input signals, respectively, the signal transmission control module 102 searches for an emission angle information corresponding to the incident angle of the radio frequency input signals and drives the antenna array to emit radio frequency output signals in a direction opposite to the incident direction of the radio frequency input signals according to the emission angle information (as shown in FIG. 1, the antennas A1~A8 emit radio frequency output signals in a direction opposite to the incident direction of the radio frequency input signals S1~S8, respectively.) By searching for emission angle information, it is feasible to identify quickly the direction and position of a communication apparatus for sending a radio frequency input signal, so as to emit a radio frequency output signal accordingly. With the whole signal processing process taking place during a stage of processing the radio frequency signals but before a stage of processing a fundamental frequency signal, it is practicable to quickly effectuate the connection between the antenna signal transmission apparatus and the communication apparatus which sends the radio frequency input signal.

In an embodiment illustrated with FIG. 1, the signal transmission control module 102 comprises switching units SW1~SW8, phase detection units 104-1~104-4, an addition unit 106 and a plurality of phase adjustment units 108-1~108-8. The switching units SW1~SW8 are coupled to the antennas A1~A8 and phase adjustment units 108-1~108-8, respectively. The switching units SW1, SW2 are coupled to the phase detection unit 104-1. The switching units SW3, SW4 are coupled to the phase detection unit 104-2. The switching units SW5, SW6 are coupled to the phase detection unit 104-3. The switching units SW7, SW8 are coupled to the phase detection unit 104-4. The phase detection units 104-1~104-4 are coupled to the addition unit 106. The addition unit 106 is coupled to the phase adjustment units 108-1~108-8. The power distributor D1 is coupled to the phase adjustment units 108-1~108-8 and the signal source SC1.

The phase detection units 104-1~104-4 receive radio frequency input signals from two antennas corresponding thereto, respectively, and generate a plurality of phase data according to the radio frequency input signals, respectively. For example, the phase detection unit 104-1 receives radio frequency input signals S1, S2 from the antennas A1, A2 through the switching units SW1, SW2, respectively, and generates the phase data according to the radio frequency input signals S1, S2, so do the phase detection units 104-2~104-4 by analogy.

Figure 2:
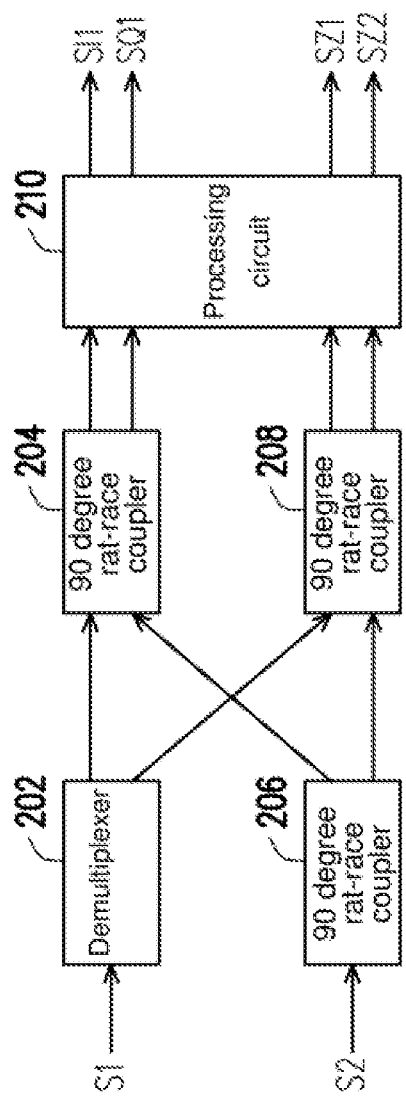
FIG. 2 is a schematic view of phase detection units according to an embodiment of the present invention.

FIG. 2 is a schematic view of phase detection units according to an embodiment of the present invention. Referring to FIG. 2, for example, the phase detection units 104-1~104-4 operate in an embodiment illustrated with FIG. 2. The phase detection units 104-1~104-4 comprise a demultiplexer 202, 90 degree rat-race couplers 204, 208 and a processing circuit 210. The demultiplexer 202 is coupled to the 90 degree rat-race coupler 204 and 90 degree rat-race coupler 208. The 90 degree rat-race coupler 206 is coupled to the 90 degree rat-race coupler 204 and 90 degree rat-race coupler 208. The processing circuit 210 is coupled to the 90 degree rat-race coupler 204 and 90 degree rat-race coupler 208. The processing circuit 210 is, for example, a microcontroller, but the present invention is not limited thereto.

In this embodiment, the phase detection unit 104-1 corresponds to the antenna A1 and antenna A2. The demultiplexer 202 receives the radio frequency input signal S1 corresponding to the antenna A1 and thereby sends the radio frequency input signal S1 to the 90 degree rat-race coupler 204 and 90 degree rat-race coupler 208. The 90 degree rat-race coupler 206 receives the radio frequency input signal S2. The output signals of the communication ports of the 90 degree rat-race couplers 204, 206 and 208 are out of phase with the output signals of the coupling ports of the 90 degree rat-race couplers 204, 206 and 208 by 90 degrees. The processing circuit 210 generates a real-part signal SI1, an imaginary-part signal SQ1 and a plurality of signals SZ1, SZ2 according to the output signals of the 90 degree rat-race coupler 204 and 90 degree rat-race coupler 208, wherein the phase data (i.e., SI1, SQ1, SZ1 and SZ2) is indicative of the phase difference between the radio frequency input signal S1 and the radio frequency input signal S2. Furthermore, the radio frequency input signal S1 and the radio frequency input signal S2 are denoted by real-part values A1, A2, respectively, thereby denoting the real-part signal SI1 by (A1−A2), imaginary-part signal SQ1 by (−j)(A1+A2), a plurality of signals SZ1 by (A1−jA2), and a plurality of signals SZ2 by (−j)(A1+jA2). By analogy, the phase detection units 104-2~104-4 obtain phase data according to two antennas corresponding thereto, respectively.

The addition unit 106 performs an addition computation on the phase data corresponding to the phase detection units 104-1~104-4, respectively. The addition computation entails adding up the real-part signals SI1 corresponding to the phase detection units 104-1~104-4, adding up the imaginary-part signals SQ1 corresponding to the phase detection units 104-1~104-4, adding up a plurality of signals SZ1 corresponding to the phase detection units 104-1~104-4, and adding up a plurality of signals SZ2 corresponding to the phase detection units 104-1~104-4, so as to generate the incident angle information (which comprises the sum of the real-part signal SI1T, imaginary-part signal SQ1T, a plurality of signals SZ1T and a plurality of signals SZ2T.) In this embodiment, since the two antennas corresponding to the phase detection units are in phase with each other, adding up the phase data corresponding to the phase detection units 104-1~104-4 can enhance the sensitivity of phase detection.

The power distributor D1 divides the input signal from the signal source SC1 to generate a plurality of power signals SP1~SP8 and sends the power signals SP1~SP8 to the phase adjustment units 108-1~108-8, respectively, whereas the phase adjustment units 108-1~108-8 generate feed signals SF1~SF8 according to the received power signals, respectively. The phase adjustment units 108-1~108-8 receive the incident angle information from the addition unit 106 and thereby not only search for related emission angle information according to the incident angle information but also send the feed signals SF1~SF8 according to the emission angle information and the related output signals SP1~SP8, respectively, to therefore trigger the related antennas A1~A8 to generate radiating beams, thereby causing the antenna array to emit the radio frequency output signals. The emission angle information comprises the information about the phase difference between the radiating beams generated from the antennas A1~A8, wherein the phase difference information depends on the phase difference between the radio frequency input signals received by the antennas A1~A8. For example, given a phase difference θ between the radio frequency input signals received by adjacent antennas, the radio frequency input signal received by the antenna A8 is 7θ ahead of the radio frequency input signal received by the antenna A1, whereas the radio frequency output signal emitted by the antenna A8 according to the emission angle information when triggered by the phase adjustment unit 108-8 lags the radio frequency output signal emitted by the antenna A1 when triggered by the phase adjustment unit 108-1 by 7θ, and in consequence the antenna array emits the radio frequency output signals in a direction opposite to the incident direction of the radio frequency input signals.

Figure 3:
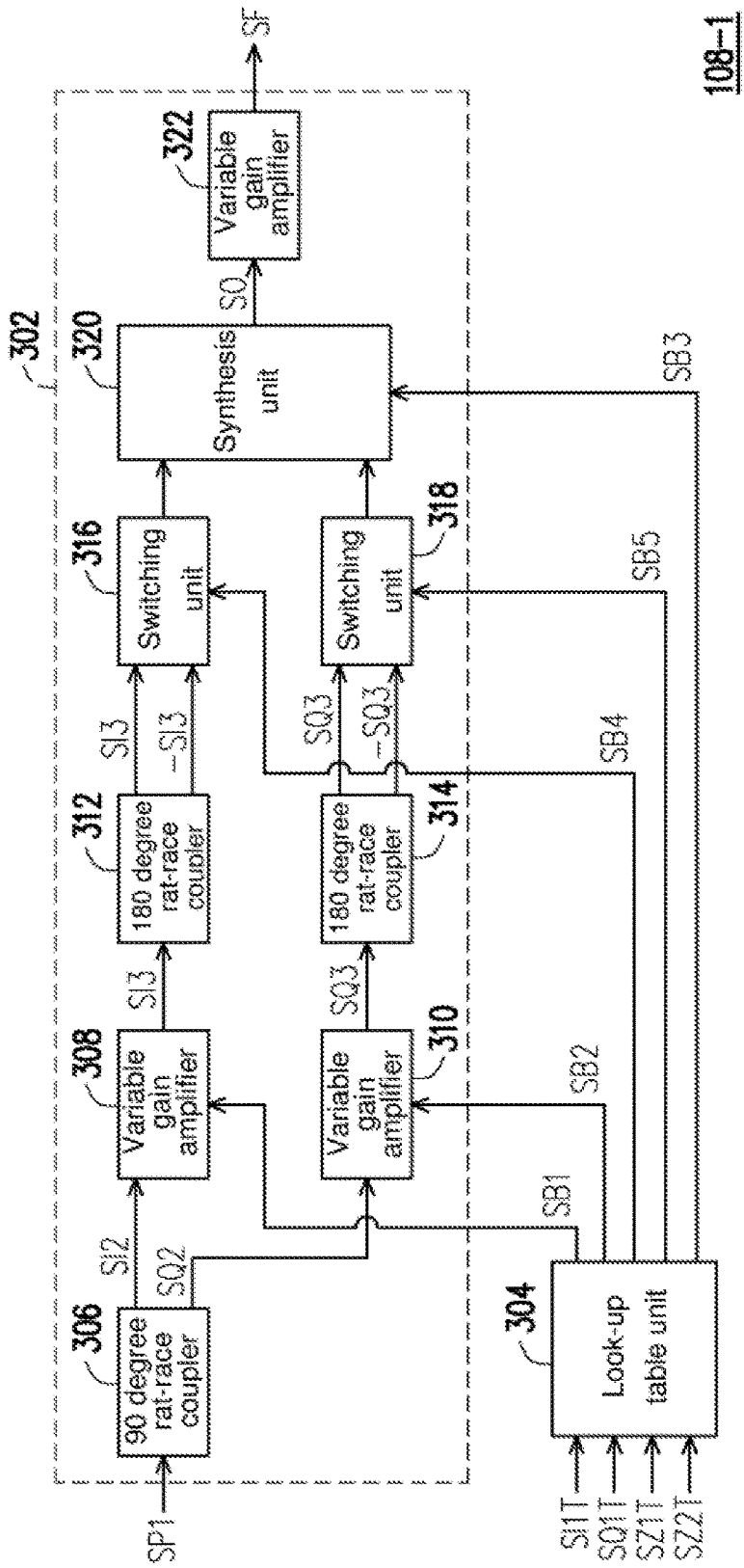
FIG. 3 is a schematic view of phase adjustment units according to an embodiment of the present invention.

The phase adjustment units 108-1~108-8 are configured in a manner shown in FIG. 3 and exemplified by the phase adjustment unit 108-1 hereunder for illustrative sake, wherein the phase adjustment units 108-2~108-8 are implemented alike. The phase adjustment unit 108-1 comprises a feed signal generate unit 302 and a look-up table unit 304. The feed signal generate unit 302 is coupled to the look-up table unit 304. The look-up table unit 304 comprises a look-up table. The look-up table unit 304 receives the incident angle information (which comprises the sum of the real-part signal SI1T, imaginary-part signal SQ1T, a plurality of signals SZ1T and a plurality of signals SZ2T) from the addition unit 106 and searches the look-up table for the incident angle according to the incident angle information of the radio frequency input signals, thereby obtaining the emission angle information of the related antennas. The feed signal generating unit 302 converts the power signal SP1 into the feed signals SF of the antennas corresponding thereto according to the emission angle information provided by the look-up table unit 304.

The feed signal generating unit 302 comprises a 90 degree rat-race coupler 306, variable gain amplifier 308, variable gain amplifier 310, 180 degree rat-race coupler 312, 180 degree rat-race coupler 314, switching unit 316, switching unit 318, synthesis unit 320 and variable gain amplifier 322. The variable gain amplifier 308 is coupled to the 90 degree rat-race coupler 306, 180 degree rat-race coupler 312 and look-up table unit 304. The variable gain amplifier 310 is coupled to the 90 degree rat-race coupler 306, 180 degree rat-race coupler 314 and look-up table unit 304. The switching unit 316 is coupled to the 180 degree rat-race coupler 312, synthesis unit 320 and look-up table unit 304. The switching unit 318 is coupled to the 180 degree rat-race coupler 314, synthesis unit 320 and look-up table unit 304. The variable gain amplifier 322 is coupled to the synthesis unit 320 and look-up table unit 304. The diagrams do not show the coupling relationship between the variable gain amplifier 322 and the look-up table unit 304.

The 90 degree rat-race coupler 306 receives the power signal SP1 to thereby generate the real-part signal SI2 and the imaginary-part signal SQ2. The variable gain amplifiers 308, 310 are controlled by the look-up table unit 304 to perform gain amplification on the real-part signal SI1 and the imaginary-part signal SQ2 and thereby generate the real-part amplification signal SI3 and the imaginary-part amplification signal SQ3, respectively. The 180 degree rat-race coupler 312 generates the real-part signal SI3 and the real-part signal −SI3 according to the real-part amplification signal SI3, wherein the real-part signal SI3 and the real-part signal −SI3 are out of phase by 180 degrees. Similarly, the 180 degree rat-race coupler 314 generates the imaginary-part signal SQ3 and the imaginary-part signal −SQ3 according to the imaginary-part amplification signal SQ3, wherein the imaginary-part signal SQ3 and the imaginary-part signal −SQ3 are out of phase by 180 degrees. Under the control of the look-up table unit 304, the switching unit 316 switches and sends the real-part signal SI3 or the real-part signal −SI3. Under the control of the look-up table unit 304, the switching unit 318 switches and sends the imaginary-part signal SQ3 or the imaginary-part signal −SQ3. The synthesis unit 320 synthesizes the output signals of the switching unit 316 and the switching unit 318 to generate the synthesis signal SO. The synthesis signal SO triggers a corresponding one of the antennas to generate the radiating beams such that the antenna emits a radio frequency output signal in a direction opposite to the incident direction of the radio frequency input signal received. However, the amplitude of the radio frequency output signal excited and generated by the synthesis signal SO might be too small, that is, having insufficient energy. Therefore, it is practicable to use the variable gain amplifier 322 which is controlled by the look-up table unit 304 to amplify the synthesis signal SO and thereby generate and send the feed signals SF to the related switching unit, thereby exciting the radio frequency output signals carrying a sufficient amount of energy through the feed signals SF.

The look-up table unit 304 is exemplified by a memory. The look-up table unit 304 sends a bit control signal to the variable gain amplifier 308, variable gain amplifier 310, switching unit 316, switching unit 318 and variable gain amplifier 322 according to the incident angle information (which comprises the sum of the real-part signal SI1T, imaginary-part signal SQ1T, a plurality of signals SZ1T and a plurality of signals SZ2T, wherein, in this embodiment, the incident angle information is exemplified by a 32-bit signal.) For example, in this embodiment, the look-up table unit 304 sends 8-bit control signals SB1, SB2, SB3 to the variable gain amplifier 308, variable gain amplifier 310 and variable gain amplifier 322, respectively, to control the amplification multiples of the variable gain amplifier 308, variable gain amplifier 310 and variable gain amplifier 322, respectively, and sends 1-bit control signals SB4, SB5 to the switching unit 316 and switching unit 318 to control the switching states of the switching unit 316 and switching unit 318, respectively. The bit-related information included in the bit control signals depends on the incident angle information.

The switching states of the switching units are controlled by the related phase detection units. The phase detection units control the switching states of the switching units corresponding to the phase detection units according to the signal sending and receiving states of the related antennas. For example, in an embodiment illustrated with FIG. 1, the switching states of the switching unit SW1 and the switching unit SW2 are controlled by the phase detection unit 104-1. After sending the phase data to the addition unit 106, the phase detection unit 104-1 switches the state of the switching unit SW1 with the state of the switching unit SW2, which entails switching the state of the switching unit SW1 from the initial state of connecting the antenna A1 and the phase detection unit 104-1 to the state of connecting the antenna A1 and the phase adjustment unit 108-1; hence, the antenna A1 sends the radio frequency input signal S1 through the switching unit SW1 and then receives the feed signal SF1 through the switching unit SW1. After a predetermined period of time has elapsed from the point in time when the phase detection unit 104-1 sends the phase data to the addition unit 106, the state of the switching unit SW1 is switched again such that antenna A1 gets connected to the phase detection unit 104-1. By analogy, the switching unit SW2 is switched in a way similar to the switching unit SW1. Furthermore, the phase detection units 104-1~104-4 and the switching units corresponding thereto operate in the aforesaid manner too.

Although the aforesaid embodiments are exemplified by an antenna array composed of eight antennas A1~A8, the aforesaid embodiments are not restrictive of the quantity of the antennas of the antenna array. In a variant embodiment, the quantity of the antennas, switching units, phase detection units and phase adjustment units are subject to changes as needed.

Figure 4:
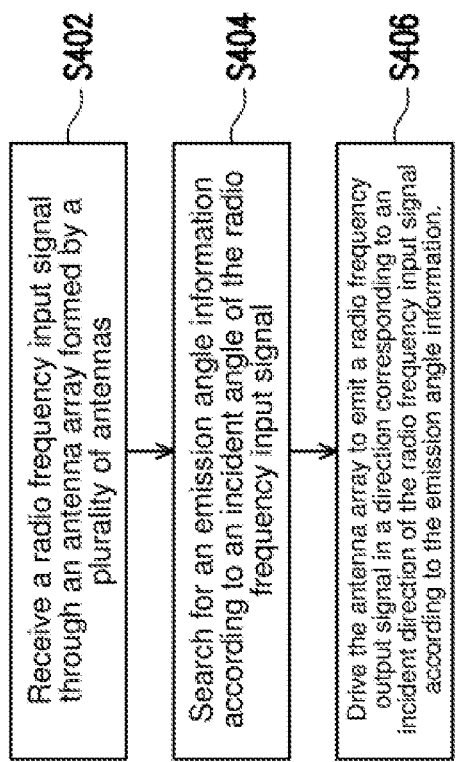
FIG. 4 is a schematic view of the process flow of an antenna signal transmission method according to an embodiment of the present invention.

FIG. 4 is a schematic view of the process flow of an antenna signal transmission method according to an embodiment of the present invention. Referring to FIG. 4, as illustrated with the aforesaid embodiment, an antenna signal transmission method for use with an antenna signal transmission apparatus comprises the steps of: receiving a radio frequency input signal through an antenna array formed by a plurality of antennas (step S402); searching for an emission angle information according to an incident angle of the radio frequency input signal (step S404) (which entails searching a look-up table unit corresponding to the antennas for an emission angle information about the antennas corresponding to the incident angle according to the incident angle corresponding to the radio frequency input signals, wherein the emission angle information comprises the information about the phase difference between the radiating beams generated from the antennas, and the phase difference information depends on the phase difference between the radio frequency input signals received by the antennas); and driving the antenna array to emit a radio frequency output signal in a direction corresponding to an incident direction of the radio frequency input signal according to the emission angle information (step S406) (which entails converting power-source signals into feed signals corresponding to the antennas according to the emission angle information and then sending the feed signals to the antennas, respectively, to trigger the antennas to generate the radiating beams, thereby causing the antenna array to emit the radio frequency output signals.)

In conclusion, the embodiments of the present invention are characterized in that: it is practicable to search for an emission angle information according to an incident angle of radio frequency input signals and thereby obtain quickly the emission angle information corresponding to the radio frequency input signals and drive an antenna array to emit radio frequency output signals in a direction corresponding to the incident direction of the radio frequency input signals; with the whole signal processing process taking place during a stage of processing the radio frequency signals, it is feasible to identify quickly the direction and position of an communication apparatus for sending a radio frequency input signal before a stage of processing a fundamental frequency signal, and therefore it is practicable to quickly effectuate the connection between the antenna signal transmission apparatus and the communication apparatus which sends the radio frequency input signal.

Although the present invention is disclosed above by embodiments, the embodiments are not restrictive of the present invention. Any persons skilled in the art can make some changes and modifications to the embodiments without departing from the spirit and scope of the present invention. Accordingly, the legal protection for the present invention should be defined by the appended claims.

What is claimed is:

1. An antenna signal transmission apparatus, comprising:
   a plurality of antennas forming an antenna array for receiving a radio frequency input signal; and
   a signal transmission control module comprising a plurality of phase adjustment units comprising a look-up table unit and searches the look-up table units according to an incident angle of the radio frequency input signal for an emission angle information of the antennas corresponding to the incident angle;
   wherein the phase adjustment units send a feed signal according to the emission angle information to trigger the antennas to generate radiating beams, thereby causing the antenna array to emit the radio frequency output signal;
   wherein the emission angle information comprises information about a phase difference between the radiating beams generated from the antennas, wherein the phase difference information depends on a phase difference between the radio frequency input signals received by the antennas.

2. The antenna signal transmission apparatus of claim 1, wherein the phase adjustment units each further comprise a feed signal generating unit coupled to a corresponding one of the look-up table units and adapted to convert a power-source signal into a feed signal attributed to the antennas and corresponding to the power-source signal according to the emission angle information provided by the look-up table unit.

3. The antenna signal transmission apparatus of claim 2, wherein the feed signal generating unit comprises:
   a 90 degree rat-race coupler for generating a first real-part signal and a first imaginary-part signal according to a power-source signal;
   a first variable gain amplifier coupled to the 90 degree rat-race coupler and the look-up table units and adapted to perform gain amplification on the first real-part signal when controlled by the look-up table units, so as to generate a real-part amplification signal;
   a second variable gain amplifier coupled to the 90 degree rat-race coupler and the look-up table units and adapted to perform gain amplification on the first imaginary-part signal when controlled by the look-up table units, so as to generate an imaginary-part amplification signal;
   a first 180 degree rat-race coupler coupled to the first variable gain amplifier and adapted to generate a second real-part signal and a third real-part signal according to the real-part amplification signal, wherein the second real-part signal and the third real-part signal are out of phase by 180 degrees;
   a second 180 degree rat-race coupler coupled to the second variable gain amplifier and adapted to generate a second imaginary-part signal and a third imaginary-part signal according to the imaginary-part amplification signal, wherein the second imaginary-part signal and the third imaginary-part signal are out of phase by 180 degrees;
   a first switching unit coupled to the first 180 degree rat-race coupler and the look-up table units and adapted to switch and send one of the second real-part signal and the third real-part signal when controlled by the look-up table units;
   a second switching unit coupled to the second 180 degree rat-race coupler and the look-up table units and adapted to switch and send one of the second imaginary-part signal and the third imaginary-part signal when controlled by the look-up table units;
   a synthesis unit coupled to the first switching unit and the second switching unit and adapted to synthesize output signals of the first switching unit and the second switching unit, so as to generate a synthesis signal; and
   a third variable gain amplifier coupled to the synthesis unit and the look-up table unit and adapted to amplify the synthesis signal when controlled by the look-up table unit, so as to generate a feed signal for triggering the antennas to generate the radiating beams.

4. The antenna signal transmission apparatus of claim 1, wherein the signal transmission control module further comprises:
   a plurality of switching units coupled to the antennas corresponding thereto and the phase adjustment units corresponding thereto, respectively;
   a plurality of phase detection units coupled to two switching units corresponding thereto and two antennas corresponding thereto, respectively, wherein the phase detection units control switching states of the switching units according to signal sending and receiving states of the antennas and according to the radio frequency input signals received by the antennas, so as to generate a plurality of phase data; and
   an addition unit coupled to the phase detection units and the look-up table units and adapted to perform an addition computation on the phase data and thereby generate and send an incident angle information to the look-up table units such that the look-up table units provide the emission angle information according to the incident angle information.

5. The antenna signal transmission apparatus of claim 4, wherein, after sending the phase data, the phase detection units switch states of the switching units corresponding thereto such that the antennas get connected to the phase adjustment units, respectively, wherein, after a predetermined period of time has elapsed from a point in time when the phase detection units switch states of the switching units, the states of the switching units are switched again such that the antennas get connected to the phase detection units, respectively.

6. An antenna signal transmission method, comprising the steps of:
   receiving a radio frequency input signal through an antenna array formed by a plurality of antennas;

searching a look-up table corresponding to one of the antennas according to an incident angle of the radio frequency input signal for an emission angle information of each said antenna corresponding to the incident angle; and driving the antenna array to emit a radio frequency output signal in a direction corresponding to an incident direction of the radio frequency input signal according to the emission angle information;

wherein the emission angle information comprises information about a phase difference between radiating beams generated from the antennas, wherein the phase difference information depends on a phase difference between the radio frequency input signals received by the antennas.

7. The antenna signal transmission method of claim 6, wherein the step of driving the antenna array to emit a radio frequency output signal in a direction corresponding to an incident direction of the radio frequency input signal according to the emission angle information comprises the sub-steps of:

converting a power-source signal into a feed signal corresponding to each said antenna according to the emission angle information; and sending the feed signals to the antennas, respectively, to trigger the antennas to generate radiating beams, thereby causing the antenna array to emit the radio frequency output signal.

* * * * *